United States Patent

Ruschmann

[15] 3,662,196
[45] May 9, 1972

[54] MAGNETICALLY COMMUTATED BRUSHLESS D.C. TORQUE MOTOR

[72] Inventor: Fred Ruschmann, Port Washington, N.Y.

[73] Assignee: Kollsman Instrument Corporation, Syosset, N.Y.

[22] Filed: Aug. 12, 1970

[21] Appl. No.: 63,169

[52] U.S. Cl. ................................. 310/68 B, 310/46, 310/156, 335/206
[51] Int. Cl. ....................................................... H02k 11/00
[58] Field of Search .................... 310/46, 219, 68, 68 B, 49, 310/67, 136–139, 237, 267, 112–114, 154, 156, 158; 335/206, 207

[56] References Cited

UNITED STATES PATENTS

| 3,297,891 | 1/1967 | Foran | 310/46 |
| 3,546,507 | 12/1970 | Wengel | 310/46 |
| 3,497,997 | 3/1970 | Sheckells | 335/206 |

FOREIGN PATENTS OR APPLICATIONS 1,223,022  8/1966  Germany ............................... 335/206

Primary Examiner—J. D. Miller
Assistant Examiner—R. Skudy
Attorney—E. Manning Giles and J. Patrick Cagney

[57] ABSTRACT

A brushless direct current motor operating through the interaction of a permanent magnet field with a commutated electro-magnetic field of changing polarity wherein current is carried from the external circuit to the windings of the armature by magnetic reed switches, each switch connected at one end to the external circuit and at the other end to the terminal of successive armature windings. The switches are placed in two circular arrays, each array containing in this instance 33 equiangularly-aligned members. A rotating magnet and plate assembly with two permanent magnet locations facing each of the arrays sequentially closes switches in two pairs, each pair consisting of one switch in the first array and one in the second array, to energize the armature windings at each operative position of the rotating magnet and plate assembly.

6 Claims, 4 Drawing Figures

INVENTOR
Fred Puschmann
BY J. Patrick Cagney
ATTORNEY

3,662,196

MAGNETICALLY COMMUTATED BRUSHLESS D.C. TORQUE MOTOR

BACKGROUND AND SUMMARY OF THE INVENTION

The motor constructed according to the present invention is a permanent magnet direct current motor. These motors operate through the interaction of a fixed permanent magnet field with a second relatively movable magnet field having a changing polarity, i.e., the armature. It is conventional to change the polarity of the rotor field or commutate by means of friction contact brushes. In accordance with the present invention, the friction contact brushes and their inherent problems are eliminated and the necessary commutation is performed through the action of a novel switch arrangement. Current is carried from an external circuit to the armature windings through switches arranged in two circular arrays and equiangularly spaced within each array. Each switch is connected at one end to the external circuit and at the other end to one end of an armature winding group. The switches are actuated in selected pairs, consisting of a switch from each array, by a rotating activating assembly; thereby, energizing the required armature windings.

As the activating assembly rotates, it sequentially closes switch pairs to activate the selected armature windings. Rotation of the motor shaft is continuous because the activating assembly operates in such a manner that each initially-closed switch does not open before the next switch in the line of rotation is closed.

This arrangement is particularly useful for extending the life of a d.c. motor in hard vacuums, in explosive and corrosive atmospheres, and in undersea and other environments where the maintenance required for a contact brush motor is particularly difficult. This construction maintains a d.c. torque motor's inherent advantages of slow speed, high torque, fast response, speed control, positioning accuracy, etc.

No additional electronic circuits or controls are required for operating this brushless d.c. torque motor than are required for operating a conventional friction brush type d.c. torque motor.

Other features and advantages of the invention will be apparent from the following description, and claims, and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same.

DETAILED DESCRIPTION OF THE PREFERRED EMBODIMENT

Figure 1:
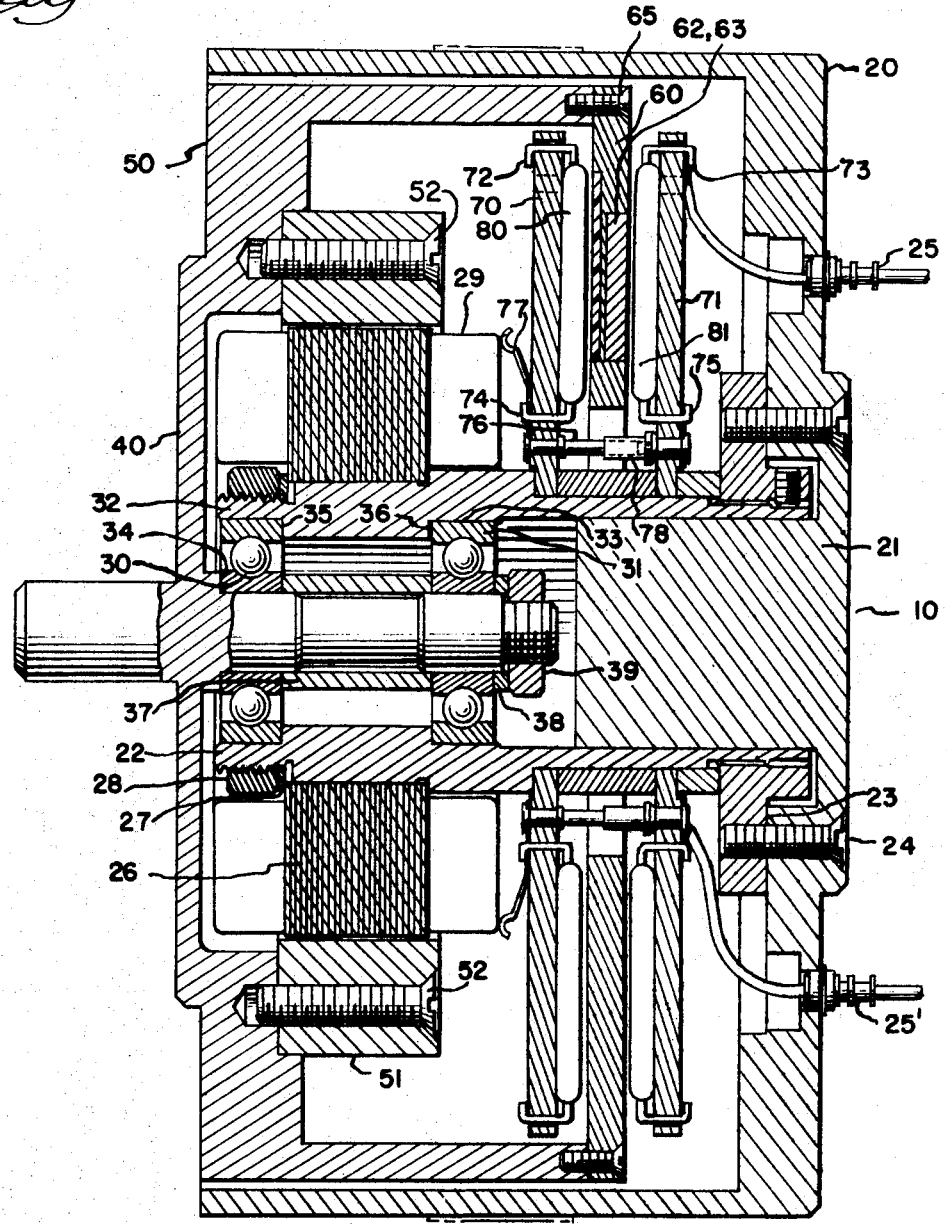
FIG. 1 is a cross-sectional view through the vertical axis of a preferred embodiment of the invention.

As shown in FIG. 1, the motor constructed according to this invention consists of a stationary assembly 10 and a rotating assembly 40.

The stationary assembly 10 includes a generally cup-shaped housing 20 which includes an axial hub 21 and a tubular mounting cylinder 22 telescoped on the hub and attached by a mounting nut 23 and four flathead screws 24 (only two shown). The mounting cylinder 22 acts as a base for the operative components of the stationary assembly. Two terminals 25, 25' are provided in the rear of the housing for electrical connections to a d.c. power supply.

The armature winding means 26 is carried on the mounting cylinder 22 and fastened to the same by a washer 27 and a threaded nut 28. The armature 26 includes a plurality of coils or windings distributed about the motor axis to produce a rotating magnetic field when selectively connected to the external d.c. power supply. In this instance, 33 commutator bars 29 (only two shown) are attached to the armature 26 in an equiangularly-spaced, circular arrangement. Each commutator bar 29 is electrically connected to the one end of each of two winding groups. The windings are selectively connected to the external power supply through stationary switches in electrical contact with the commutator bars, the construction and operation of these switches will subsequently be described in detail.

The rotating assembly 40 is connected to the stationary assembly 10 while being freely revolvable through the action of two ball bearings 30, 31.

The outer races of the two ball bearings 30, 31 sit in bearing seats 32, 33 in the inner diameter of the mounting cylinder 22. The front bearing 30 sits against a shoulder 34 in the flanged shaft 50 which is the base for the rotating assembly 40. The front bearing 30 is trapped because its inner race sits against the shoulder 34 in the flanged shaft 50 and its outer race sits against a shoulder 35 in the mounting cylinder 22. A tube 37 separates and preloads the two bearings by seating against the other side of the inner race of the front bearing 30 and the inner race of the back bearing 31. The end play of the flanged shaft is determined by the dimensional difference between the length of the tube 37 and the distance between the bearing shoulders 35, 36 inside the mounting cylinder 22. The bearings 30, 31 and the flanged shaft 50 are trapped by a washer 38 and a nut 39 on the end of the flanged shaft 50 driven against the inner race of the back bearing 31.

The rotating assembly 40 includes a permanent magnet motor field 51 attached to the flanged shaft 50 in such a position that it encircles the armature field 26. The motor field 51 is attached to the flanged shaft 50 by four flathead screws 52 (only two shown).

In accordance with the present invention, a magnet and plate assembly 60 operates in conjunction with two arrays of magnetic reed switches 80, 81. These switches carry the current from the external source to the armature so that a rotating magnetic field is produced in the armature 26. The operation of the motor is caused by the interaction of the armature field with the permanent magnet field 51.

Figure 2:
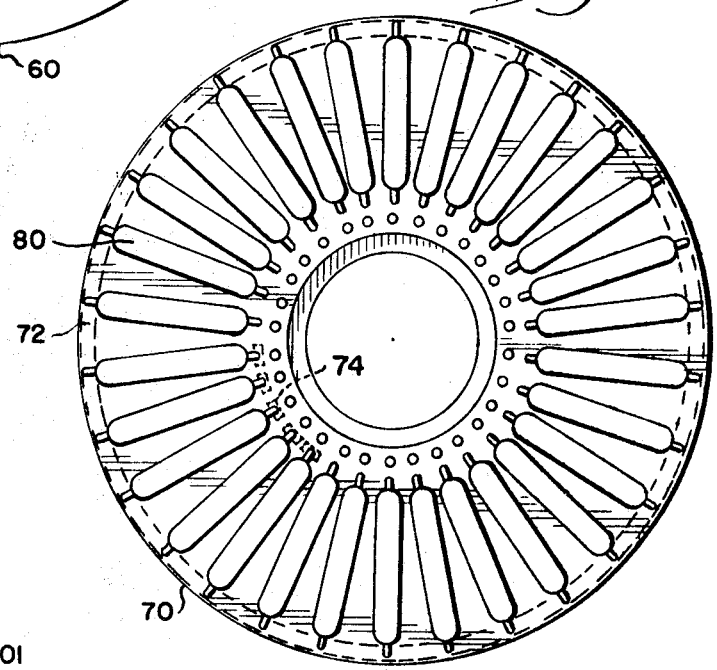
FIG. 2 is a front view of one of the circuit boards containing the reed switch array.

As shown in greater detail in FIG. 2, the front printed circuit board 70 is circular in shape and has a continuous copper strip 72 near its outer edge and 33 equally-spaced copper segments 74 located near the center of the board 70. Thirty-three reed switches 80 are mounted to the board in a circular array, wherein the switches are equi-angularly spaced and radially elongated. One end of each reed switch is connected to the continuous copper strip 72 which serves as a common terminal and the other end is connected to a corresponding one of the inner copper segments 74. The continuous copper strip 72 is electrically connected to the negative terminal of the motor.

The circular rear printed circuit board 71 is spaced apart from but on the same axis as the front printed circuit board 70. The rear board 71 has a continuous copper strip 73 near its outer edge and 33 equally-spaced copper segments 75 located near the center of the board 71. Thirty-three reed switches 81 are mounted to the board 71 in a circular array, wherein the switches are equiangularly spaced and radially elongated. One end of each reed switch is connected to the continuous copper strip 73 which serves as a common terminal and the other end is connected to a corresponding one of the inner copper segments 75. The continuous copper strip 73 is electrically connected to the positive terminal 25 of the motor.

Each copper segment 74 on the front board 70 has a male contact 76 pressed through it and a conductive contact spring 77 soldered to its back. The 33 contact springs 77 line up with the 33 commutator bars 29 on the rotor. Each spring makes electrical contact with one commutator bar.

Each copper segment on the rear board has a female electrical socket 78 pressed through it. The male contacts 76 in the front board 70 mate with the female sockets 78 in the rear board 71. Therefore, when the front or rear switch of two commonly-connected switches is closed, current will pass into the contact spring 77 and through to the commutator segment 29. Each commutator segment 29 contains two armature winding groups. An armature winding group is energized when the switches connected to both of its terminals are closed.

Figure 3:
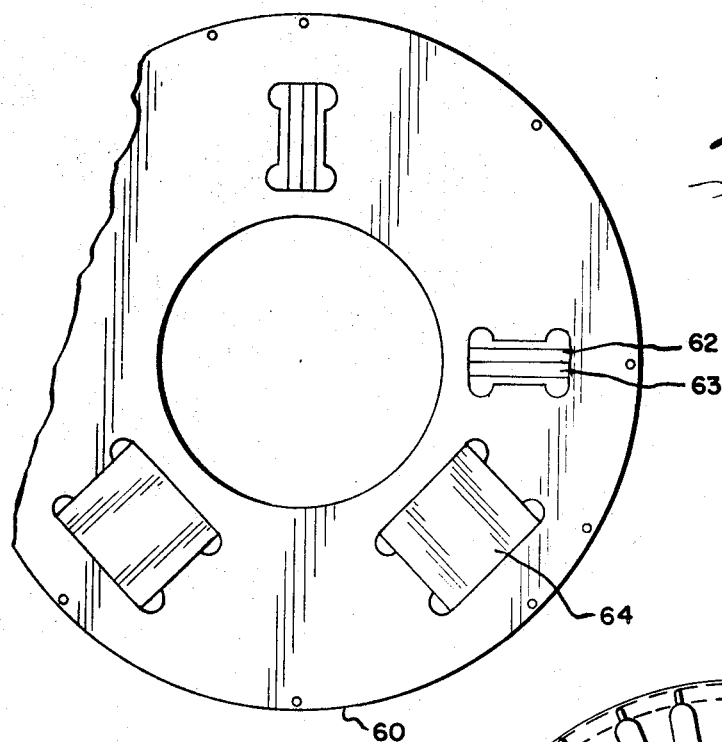
FIG. 3 is a front view of the magnet and plate assembly.

The actuating magnet and plate assembly 60 is attached to the flanged shaft 50 by eight flathead screws 65 (only two shown) and rotates with it. As shown in detail in FIG. 3, two in this instance, individual permanent magnets 62, 63, comprising a single actuator are cemented into each of two recessed areas on each side of the mounting plate; therefore, there are two actuator magnet locations on each side of the plate. At each actuator magnet location, a mumetal lamination assembly 64 is cemented into a recessed area behind each of the magnets on the opposite side of the mounting plate 60; these mumetal laminations 64 serve as magnetic shields so that the magnetic action on the switches operates solely in one direction. The axial location of the magnet and plate assembly 60 and the two assembled printed circuit boards 70, 71 is such that there is in this instance a 0.015 inch to 0.020 inch air gap between the magnets in the mounting plate and the reed switches on the two printed circuit boards.

The above construction results in a pair of actuating magnet locations facing the reed switches on the front printed circuit board 70, and the other pair of magnet locations on the other side of the magnet and plate assembly facing the reed switches on the rear printed circuit board 71. The radial position of each magnet location is such that the center of the magnets pass by the center of the reed switches, so that the magnetic field operates the switches. The two magnet locations facing the front board 70 are separated in this instance by 90°, as are the locations facing the rear board 71. In this embodiment, the relative angular positions of the magnet locations are 0°, 90°, 135° and 225°.

The operation of the motor shown in FIG. 1 is as follows: Current flows from the positive side of the d.c. power supply to the positive terminal 25 of the motor and then to the continuous copper strip 73 on the rear printed circuit board 71. The d.c. current then flows through the reed switches 81 which have been closed on the rear printed circuit board by the actuating magnets in the magnet and plate assembly facing the rear printed circuit board. The current then passes through the female electrical sockets 78 at the base of the closed reed switches and to the mating male contacts 76 in the front printed circuit board 70, then through the contact springs 77 attached to those particular male electrical contacts. The current then flows from the contact springs 77 through the contacted commutator bars 29. From the commutator bars the current flows into and energizes the windings which have both ends placed into circuit by the closure of the proper switches, one in the front board 70, and one in the rear board 71. Current flows through these windings out to the respective commutator bar. The current then flows from these commutator bars 29 to the springs 77 in contact with them and continues through the reed switches 80 on the front printed circuit board 70 which have been closed by the magnets facing the front printed circuit board. The current flows out of the closed reed switches on the front circuit board to the continuous conductive strip 72 on the board and out through the leadwire connected to this strip to the negative terminal 25' on the housing and then out to the negative side of the d.c. power supply.

Current flow in the coils of the armature produces a magnetic field which interacts with the magnetic field set up by the permanent magnet motor field. This interaction produces rotation of the flanged shaft. Rotation is continuous because the magnets in the magnet and plate assembly are located in such a manner that the initially-closed reed switch does not open before the adjacent reed switch in the line of rotation is closed. If the connections from the d.c. power supply to the terminals on the motor housing are reversed, the direction of rotation of the motor will reverse.

It is to be understood that a motor can be constructed according to this invention whereby the flanged shaft with its attaching parts is stationary, while the mounting cylinder with its attaching parts is rotating. The necessary power is supplied to the rotating printed circuit boards by contacts sliding on slip rings.

Figure 4:
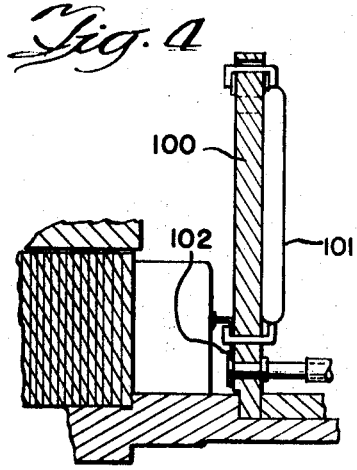
FIG. 4 is an illustration of an alternative embodiment of the invention in which the armature windings are connected directly to the reed switches.

In the arrangement of FIG. 4, the windings of the rotor 100 are connected directly to the reed switches 101. The contact is made through the copper segment array 102. This construction eliminates the need for commutator bars or contact springs.

The apparatus constructed according to this invention could be operated as a d.c. generator. If the rotating member is driven by an external drive member, then the apparatus will generate a d.c. voltage.

Thus, while preferred constructional features of the invention are embodied in the structure illustrated herein, it is to be understood that changes and variations may be made by those skilled in the art without departing from the spirit and scope of the appended claims.

What is claimed is:

1. In a direct current motor that includes permanent magnet motor field means rotatable about a central axis and a stationary armature winding means for producing rotary movement about said common central axis in response to a changing polarity current in said armature winding means, said armature winding means having a plurality of winding groups distributed about said axis; a first circular array of angularly-aligned, normally-open, magnetic reed switches spaced about said axis and fixed relative to said armature winding means, said first array connected to a first terminal and each of said switches in said first array individually connected to one end of each of said winding groups through a corresponding spring in contact with a corresponding commutator bar attached to the armature winding means; a second circular array of angularly-aligned, normally-open, magnetic reed switches spaced about said axis so that each switch in said second array is opposite and apart from a corresponding switch in said first array and fixed relative to said armature winding means, said second array, connected to a second terminal and each of said switches in said second array individually connected to the other end of each of said winding groups through a spring shared with a switch in said first array connected to a subsequent winding group and the corresponding commutator bar, each of said commutator bars is in electrical contact with the ends of two armature winding groups; and a permanent magnet actuating means comprising a plate rotatable in unison with said permanent magnet motor field and carrying spaced magnets for simultaneously closing the reed switches connected to opposite ends of a selected winding group and sequentially actuating each of said winding groups said first array consisting of 33 reed switches and said second array consisting of 33 reed switches.

2. Apparatus as in claim 1 wherein the said plate of the permanent magnet actuating means contains two magnet locations on a first side of the plate with shielding means on the second side of the plate in back of each of the magnet locations and two magnet locations on a second side of the plate at different angular positions from the magnets on the first side with shielding means on the first side in back of each of these second magnet locations.

3. In a direct current motor that includes permanent magnet motor field means and armature winding means for producing relative rotary movement about a common central axis in response to a current in said armature winding means, said armature winding means having a number of winding groups distributed about said axis; a first circular array comprising a corresponding number of equi-angularly spaced, radially extending, normally-open magnetic switches spaced about said axis, separate means connecting such of said switches of said first array to one end of a corresponding one of said winding groups; a common first terminal connected to each of said switches, a second circular array comprising a corresponding number of equi-angularly spaced, radially extending, normally-open magnetic reed switches spaced about said axis, separate means connecting each of said switches of said second array to the opposite end of a corresponding one of said winding groups; a common second terminal connected to each of said switches of said second array; and rotatable means mounting a plurality of first magnetic actuating means for controlling operation of the switches of said first array and a plurality of second magnetic actuating means for cooperatively controlling operation of the switches of said second array for simultaneously closing the ones of said switches connected to opposite ends of the same winding group, said plurality of first actuating means being spaced in a predetermined angular relation about said axis to define an open angular region of sufficient extent to span several of said switches of said first array and said plurality of second actuating means being spaced in a corresponding predetermined angular relation about said axis to define an open angular region of sufficient extent to span several of said switches of said second array, each of said first and second actuating means being of sufficient angular span to maintain actuation of a closed switch until after the next succeeding switch of its corresponding array is closed to provide a continuously acting force field of narrower spread and in more direct angular alignment with the permanent magnet motor field means so as to impart higher continuous torque.

4. Apparatus as in claim 3 wherein said rotatable means is a plate positioned between said first and second arrays and movable relative to said arrays, said plate contains first permanent magnet means facing the first array and constituting said first actuating means and second permanent magnet means facing the second array and constituting said second actuating means.

5. Apparatus as in claim 4 wherein said first magnet means consists of two permanent magnet locations and said second magnet means consists of two permanent magnet locations at different but corresponding angular positions from the locations of the first magnet means.

6. Apparatus as in claim 5 wherein a magnetic field shielding means is located on the opposite side of the plate in back of each magnet location.

* * * * *

UNITED STATES PATENT OFFICE
CERTIFICATE OF CORRECTION

Patent No. 3,662,196         Dated May 9, 1972

Inventor(s) Fred Ruschmann

It is certified that error appears in the above-identified patent and that said Letters Patent are hereby corrected as shown below:

Col. 4, line 74: The word "such" should be --each--.

Signed and sealed this 25th day of July 1972.

(SEAL)
Attest:

EDWARD M. FLETCHER, JR.         ROBERT GOTTSCHALK
Attesting Officer                 Commissioner of Patents